3,217,082
SNAP-ACTION FAULT PROTECTOR FOR ELECTRICAL APPARATUS
Charles R. King, East Rochester, and George E. Ford, Rochester, N.Y., assignors to Qualitrol Corporation, Fairport, N.Y., a corporation of New York
Filed Oct. 8, 1962, Ser. No. 229,065
4 Claims. (Cl. 174—11)

The present invention relates to electrical apparatus and, more particularly, to instantaneous snap-acting pressure protection devices for relieving excessive pressures built up beyond safe limits within the tank of a power transformer.

High voltage transformers are generally submerged in a tank of transformer oil to keep them cool and insulated. This oil has a relatively large coefficient of expansion in response to any particular given rise in the temperature of the oil, so that it is necessary to allow some expansion space in the tank above the top of the oil, this expansion space being filled with air or, preferably, with a cushion of inert gas at atmospheric pressure. Whenever the coils of the transformer become overheated due to overload, the oil expands appreciably, thereby compressing and raising the pressure of the cushion of air or other gas. Whenever the insulation of the transformer coils breaks down to the point where arcing occurs, the oil in the transformer tank breaks down and evolves gas very rapidly. This evolved gas contains a great amount of hydrogen, which may form an explosive mixture with any oxygen present. Therefore it is essential to have a method for relieving the pressure built up within the tank by the expansion of the oil or, more seriously, by the breakdown of the oil and the evolution of gas therefrom. These pressures build up at a phenomenally fast rate so that it is most important that the pressure relief valve for such a tank operate extremely fast, such as opening wide within one-half a cycle of the typical 60 cycle current, or $\frac{1}{120}$ of a second after the pressure has reached the critical stage.

Since high voltage transformers are often placed in underground incasements which may become flooded, it is essential that a pressure relief valve for such a transformer tank not only be fast opening but also reseal itself before atmospheric gases, or water surrounding the tank, can enter. This is necessary to minimize the possibility of explosions resulting from the mixture of extraneous oxygen and the hydrogen developed in the tank.

To meet competition, it is becoming increasingly important to the manufacturers of such high voltage transformers to cut down their costs as much as possible. One result of this cost-cutting has been the steady reduction in the relative size of the tanks in relation to the transformer coils, thereby putting a premium on any space taken up within the tank by a relief valve. This last stated fact, combined with the other requirements above set forth, gives the necessary background to understand the following brief discussion of why prior art devices are somewhat less than wholly satisfactory: One type of prior art device is a frangible disk which is shattered by the increasing pressure within the tank. This type of valve is unsatisfactory in that it is diffcult to tell with any great degree of accuracy the pressure at which the disk will shatter, and further, following the shattering of the disk, the transformer must be taken out of service until the disk can be replaced, the fragments cleaned out, and the casing recharged with the inert gases that are used to fill the top of the transformer tank above the oil level. Other prior art devices do not operate fast enough to provide a fully satisfactory margin of safety in view of the extremely fast build up of tank pressures, while most are extremely heavy and costly to build, requiring special calibration to assure that they will release before critical pressures are reached. Also, nearly all have parts hanging within the tank itself, and this construction not only invites the dangerous possibility that the parts may loosen, fall into the tank and cause short circuits, but further requires that the tanks be built large enough to accommodate the parts of these valves which extend into the body of the tank itself. In addition, in relief valves constructed with such internally extending parts, these parts considerably reduce the opening for, and present an obstacle to, the discharge of gases from the tank.

Since many of these prior art devices have a relatively large mass, considerable force is required to set them in motion and great strength has to be built into the unit to overcome the inertia of that great mass once it gets into motion, thereby presenting the possibility of a dangerous lag in the operation of the relief valve when there is a sudden rise in the pressure, and also giving rise to the relatively high costs which must be incurred when building and installing such a heavy device. Also, in some prior art devices the valve itself is exposed to surrounding atmospheric conditions and can be seriously affected whenever the unit becomes incased with sleet and ice of several inches thickness. However, it is just under the conditions of such sleet and ice storms that broken lines and short circuits may result in the tremendous overload and overheating of the transformer.

The present invention satisfies all of the requirements for this type of equipment and overcomes the above mentioned shortcomings of presently used prior art devices. The equipment described herein utilizes two springs which can be economically designed to permit manufacture to such accuracy that the valve will open at a pressure within one pound per square inch of the opening pressure desired, thereby eliminating the need for calibration after installation. The moving parts of this device are also of light weight which makes them extremely fast acting, permitting the pressure within the tank to drop to levels far below that accomplished by prior art devices while at the same time maintaining the integrity of the tank against outside atmosphere. Further, this device will operate normally in spite of extremely heavy conditions of icing, and it has no parts which extend into or which can fall into the tank itself.

It is an object of this invention to provide a generally improved and more satisfactory snap-action fault protector for electrical apparatus.

Another object of the invention is to provide enclosed electrical apparatus in combination with a fault protector device which resets and reseals itself automatically after the device has opened to relieve pressure within an enclosed tank or chamber.

Yet another object of the invention is the provision of a new and improved pressure relieving fault protector valve which will greatly reduce the pressure within an enclosed tank and then reseal itself before gases or moisture outside of the tank can enter the body of the tank or enclosure.

A further object is to provide a new and improved pressure relief valve which will operate normally even though covered by several inches of ice.

A still further object is the provision of a new and improved pressure relief valve which is relatively light weight, which may be manufactured inexpensively, and which has no parts which encroach into the actual body of the tank or enclosure, and which, therefore, can be simply and economically attached anywhere to the top of a high voltage transformer tank.

Another object of the invention is to provide a new and improved pressure relief valve which utilizes a simple colored cylinder as a warning flag to call attention to the fact that the pressure within the tank has caused the relief valve to operate, said cylinder being acted upon directly by the full opening force of the valve.

Yet another object is to provide a new and improved pressure relief valve which upon operation sets off a remote warning switch for providing a remote indication of the operation of said valve, said remote warning switch being unaffected by the icing of the valve, and said switch remaining in its warning condition until manually reset even though the valve has automatically reseated itself.

Yet another object is a provision of a new and improved pressure relief valve which can be inexpensively designed for a particular relief pressure without requiring further calibration.

These and other desirable objects may be attained in the manner disclosed as an illustrative embodiment of the invention in the following description and in the accompanying drawings forming a part hereof, in which.

The fault protector according to the present invention is particularly designed for and useful in combination with an electrical transformer tank, but certain features of the valve have general utility wherever its structure or operation adapts it to be used.

In a tank housing a high voltage transformer, the electrical apparatus is immersed in a bath of oil or the like, and the space between the top of the oil bath and the top of the tank is filled with gas, preferably inert gas of some sort. The pressure relief valve herein described is mounted toward the top of the tank above the upper surface of the oil bath, and is preferably mounted in the top or cover of the tank for relieving excess pressure developed in the inert gases before the pressure within the tank has had an opportunity to reach an unsafe level.

The pressure of the gases at the top of the transformer tank fluctuates in response to changes in internal and external conditions, and increases above a safe level because of two general types of cases. In one case, there may be an increase in the operating temperature of the transformer, or of the temperature of the air surrounding the transformer tank, resulting in a gradual increase in the pressure of the gases until an unsafe level is reached. In the other case, there may be an arcing or fault or explosion of the transformer apparatus resulting in a sudden increase of the pressure within the tank to a relatively high level. The fault or explosion actually occurs in the area submerged in the oil, and tremendous liquid pressures build up as well as gas pressures above the oil within a very short time. It has been found that the pressure relief in this latter case should occur within ½ of a current cycle in order to alleviate this dangerous situation and to prevent the development of pressures large enough to puncture the tank, the relief being required within $\frac{1}{120}$ of a second assuming a normal 60 cycle current.

Figure 1:
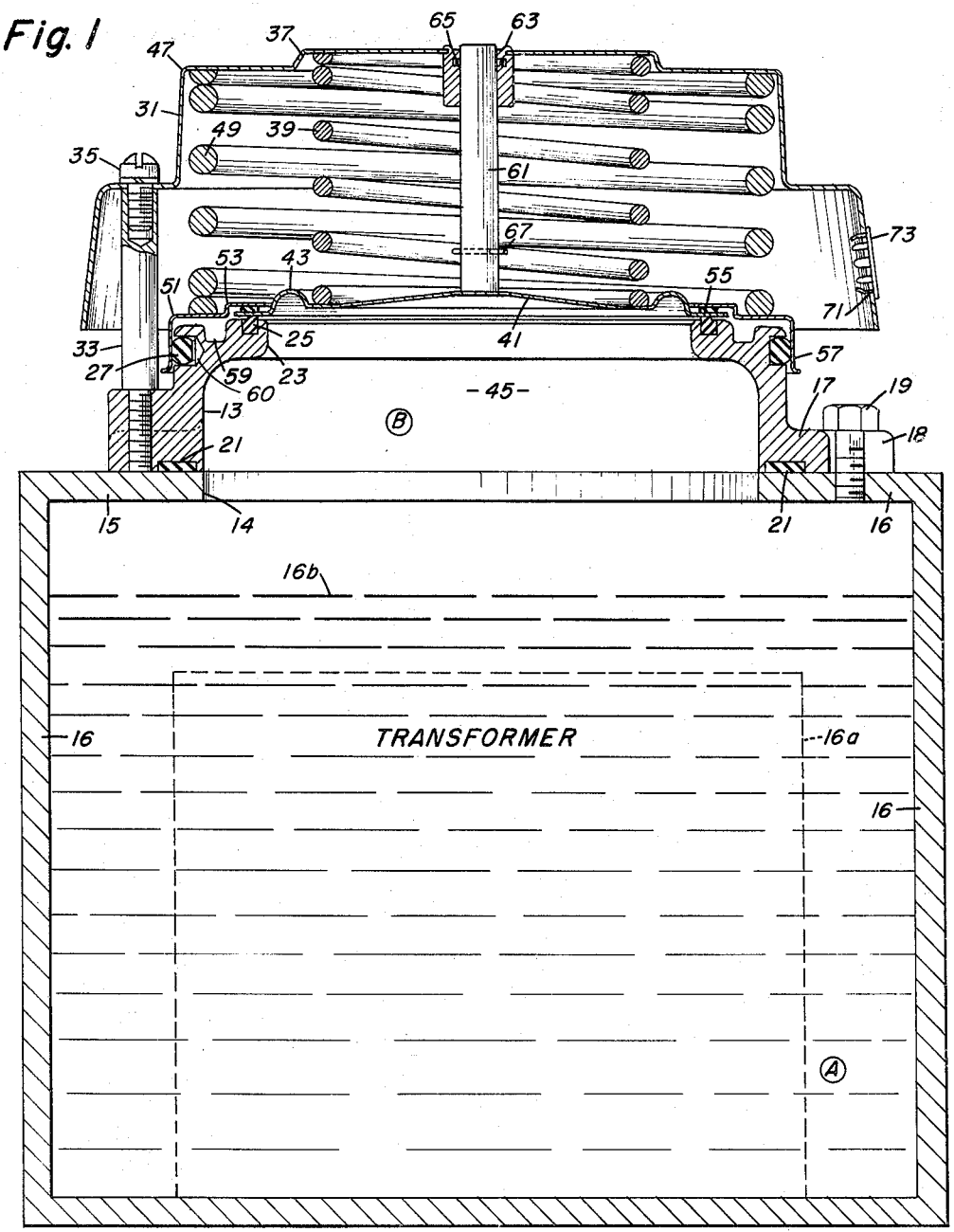
FIG. 1 is a cross sectional view of a pressure relief valve according to a preferred embodiment of the present invention, the valve being shown in its closed position and mounted on a transformer tank, a fragmentary portion of which is shown.

In FIG. 1 is shown a tubular body having a lower portion or base 13, preferably circular in horizontal cross section, which is mounted in surrounding relation to a circular aperture or opening 14 in the top wall 15 of a housing or tank 16 to which the device is attached. Within the housing 16 is the high voltage transformer 16a immersed in insulating oil 16b. The lower end of the lower portion 13 is provided with a laterally extending mounting flange 17 having appropriate slots 18 for receiving bolts 19 or other clamping means for rigidly mounting the valve on the outside of the tank. To provide a pressure seal mounting for the base 13, a circular gasket 21 is imbedded in its lower edge bearing down on the surface of the wall 16 of the tank.

The tubular base 13 narrows on its inner surface from the tank aperture 14 to a level ring 23. Imbedded in the upper surface of the level ring 23 near its inner circumference is a circular gasket 25, and imbedded in the outer circumference of the level ring 23 is a circular gasket 27.

An upper housing or cap 31 is mounted on the base 13 by means of studs 33 and shoulder screws 35. The top of the upper housing or cap 31 has an annular ridge 37 which is used to position one end of an inner spring 39.

The opposite end of the inner spring 39 rests on the upper surface of a valve disk 41 which has a shallow cup form with an annular ridge 43 alining it with the lower end of the inner spring 39. The outer edge of the valve disk 41 rests on the gasket 25 when the valve disk is in its sealing position as illustrated in FIG. 1, thus closing or sealing off the pressure relief opening 45.

The upper housing or cap 31 is formed so that its top and flange meet to form the annular corner 47 which secures and positions the upper end of an outer spring 49. The lower end of the outer spring 49 compresses against the upper surface of an otherwise loosely mounted annular disk 51, the upper surface of which has an annular ridge 53 for receiving the lower end of the outer spring 49. In its normal rest position the annular disk 51 has its inner edge compressed against the circular gasket 55 which is cemented to the upper surface of the outer edge of the valve disk 41, and the laterally and downwardly extending flange 57 of the annular disk 51 abuts the circular gasket 27 to provide a pressure tight seal around the outer circumference of the level ring 23 of the base 13. The valve disks 41 and 51 are both made of light sheet metal, therefore having relatively low inertia and low resistance to quick starting movement in an opening direction.

On the upper surface of the level ring 23, intermediate its outer circumference and the circular gasket 25, is an annular recess which, in conjunction with the lower surface of the annular disk 51 and the circular gaskets 25, 27, and 55, forms an outer chamber 59 which is substantially pressure tight. However, at one or more points spaced circumferentially around the groove in which the O-ring gasket 27 is seated, the bottom of the groove is radially recessed as shown at 60, so that the O-ring does not press tightly against the flange 57 at such point or points, thereby allowing a slight "bleed" leakage to keep the pressure in the chamber 59 substantially at atmospheric pressure under normal conditions.

To provide a visible signal for indicating the fact that the relief valve has operated or "blown," a bright colored flag member 61, preferably in the form of a cylindrical rod of plastic material, is slidably mounted in a sleeve 63 secured to an aperture in the center of the upper housing 31. An O-ring 65 serves the dual function of providing a moisture seal and of holding flag 61 frictionally in any particular position to which it has been operated, while a cotter pin 67 projecting radially from the flag 61 near its lower end prevents the flag 61 from being completely withdrawn through upper housing 31. Whenever the pressure relief valve is operated by the raising of the valve disk 41, the flag 61 is forced through the sleeve 63 to protrude above the upper surface of upper housing 31. Although the relief valve mechanism resets itself automatically when pressure conditions return to normal, the signal flag 61 is not reset automatically but is held by the O-ring 65 in its attention-attracting position until manually reset. Thus an attendant, making periodic inspections of the apparatus, is apprised of the fact that the relief valve has operated or "blown" since his last visit, even though conditions might again be normal at the moment.

In addition to the visible signal flag 61, it is frequently desired to have an indication of relief valve operation given at a remote point. To that end, the upper housing 31 is provided with an aperture 71 through which may be mounted a remote switching mechanism such as that shown in FIG. 7 and explained below. However, if remote indications through an electric circuit are not wanted, the switch mechanism is omitted entirely when assembling the device, and the aperture 71 in upper housing 31 is enclosed by a conventional plug 73 (of the familiar kind used in closing unwanted holes in electric junction boxes, etc.) as seen in FIGS. 1, 2, 3 and 4, to prevent rain from passing through the aperture 73 and possibly freezing on the movable members of the relief valve.

It should be noted that in the construction just described there are not parts of the valve which extend into the tank or limit the size of the relief valve opening 45 other than the sealing surface of the valve disk 41.

It will now be assumed that the preferred form of the relief valve illustrated in FIG. 1 has been designed for and assembled on the top of a transformer tank in which a pressure of 10 p.s.i. is considered critical, the valve being designed to operate and relieve tank pressure whenever the pressure within the tank rises to this level. It will further be assumed that the surface area of the valve disk 41 exposed to the pressure within the tank is equivalent to approximately 30 square inches, and that the surface area of the annular disk 51 which is exposed to any pressure present in outer chamber 59 is approximately 20 square inches and, further, that the heavier outer spring 49 is designed to exert a force of 189 pounds against the upper surface of annular disk 51, while the lighter inner spring 39 is designed to exert a force of 111 pounds against the upper surface of the valve disk 41. Since the annular disk 51 overlaps the valve disk 41, the combined force of both the inner spring 39 and the outer spring 49 combine to seal the valve disk 41 against the circular gasket 25. Since the combined force of both springs is equivalent to 300 pounds, and since the area of valve disk 41 exposed to the pressure o the transformer tank is equivalent to approximately 30 sqaure inches, it can be seen that the valve disk 41 will remain tightly sealed until the pressure within the tank reaches a level of 10 pounds per square inch.

Figure 2:
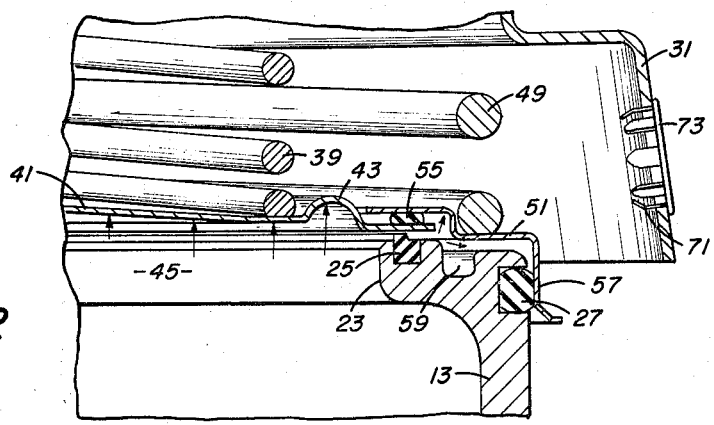
FIG. 2 is a section similar to a fragment of FIG. 1, illustrating the valve at the moment when the pressure within the tank has reached the calibrated relief pressure.

When the critical pressure of 10 p.s.i. is reached within the tank, the seal between the outer edge of the valve disk 41 and the circular gasket 25 begins to weaken and the pressure from the tank begins to leak into the outer chamber 59 as illustrated by the arrows in FIG. 2. The gas leaking into this outer chamber is under the same pressure as the gas in the tank, namely, 10 p.s.i., and this pressure leaking into the outer chamber 59 is maintained momentarily in outer chamber 59 by virtue of the sealing effect caused by the overlapping of the outer and inner edges of the valve disk 41 and the annular disk 51, respectively, and by virtue of the pressure seal provided by the abutting of the flange 57 of the annular disk 51 against the circular gasket 27.

Figure 3:
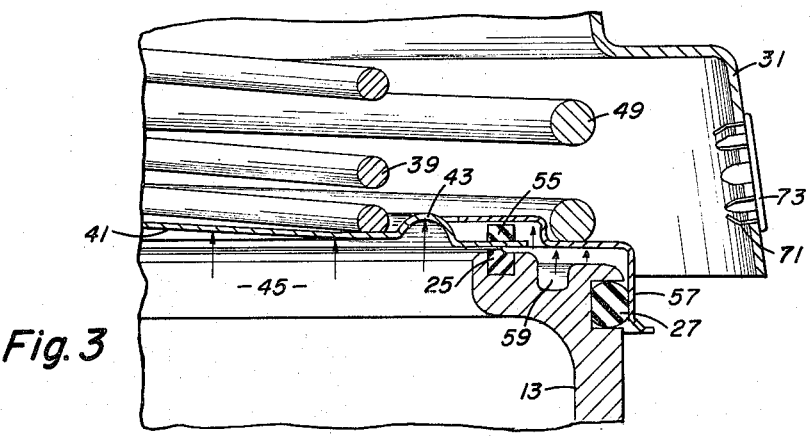
FIG. 3 is a view similar to FIG. 2 illustrating the position of the shown members of the valve just prior to the opening of the valve in response to excessive pressure within the tank.

Since the surface area of the annular disk 51 exposed to any pressure present in the outer chamber 59 is approximately 20 square inches, the upward pressure upon annular disk 51 is approximately 200 pounds, while the force of the outer spring 49 is 189 pounds as stated above. Therefore, annular disk 51 begins to rise as shown in FIG. 3.

Figure 4:
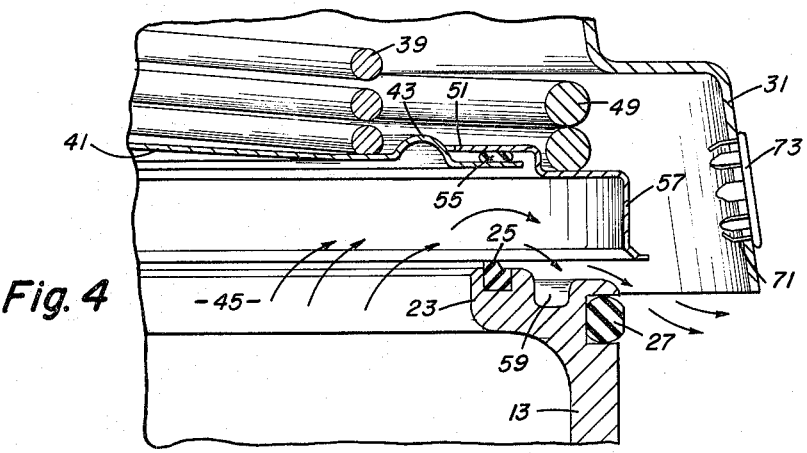
FIG. 4 is a view similar to FIGS. 2 and 3 illustrating the position of the valve when fully opened in response to excessive pressure in the tank.

As soon as the annular disk 51 begins to rise, it removes the pressure of the outer spring 49 from the outer edge of the valve disk 41, and at that very instant the 300 pounds of pressure being exerted upon the lower surface of the valve disk 41 is opposed only by the force of the inner spring 39, namely, 111 pounds. This causes the valve disk 41 to be accelerated in an upward direction at a speed exceeding that of the upward movement of the annular disk 51 which is rising in response to the pressure in the outside chamber 59. The valve disk 41 therefore catches up with, and imparts part of its momentum to, the annular disk 51, and both disks begin moving extremely rapidly in an upward direction. The effect of the light mass of the moving parts of the valve, coupled with the positive "blowing" open of the valve by the striking of the annular disk 51 by the valve disk 41 and the sudden exposure of 500 pounds of opening force acting against only 300 pounds of spring closure force, combine to cause the valve disk 41 and the annular disk 51 to be driven upward at an extremely high velocity. This causes the flange 57 of the annular disk 51 to disengage the circular gasket 27 and to rise above the upper surface of level ring 23 of the base 13, providing a clear passageway for the escape of gas from the tank to the atmosphere as illustrated in FIG. 4.

Figure 5:
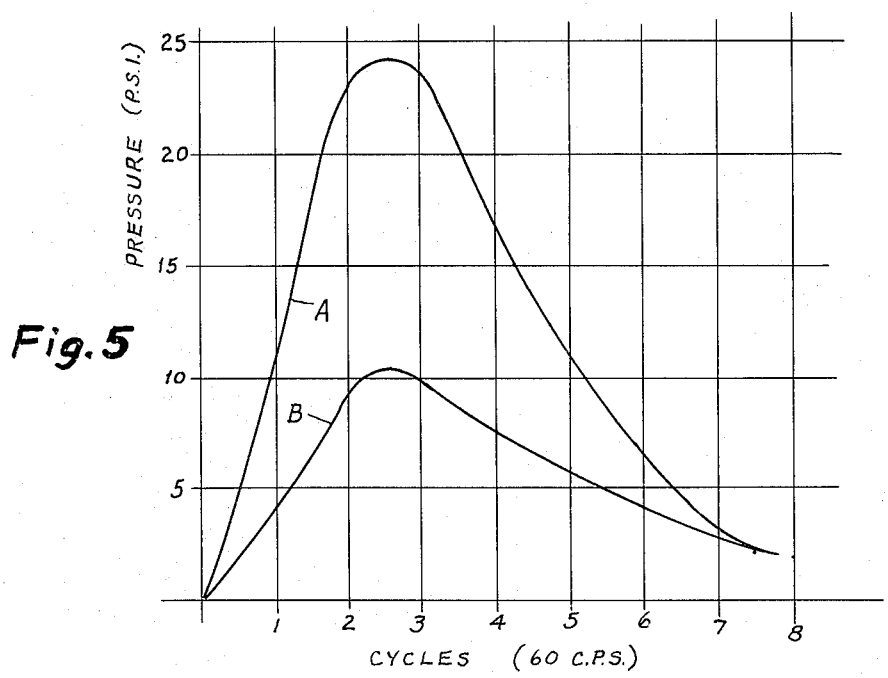
FIG. 5 is a graph illustrating the pressure within a tank being successively relieved by the action of one type of prior art relief valve.
Figure 6:
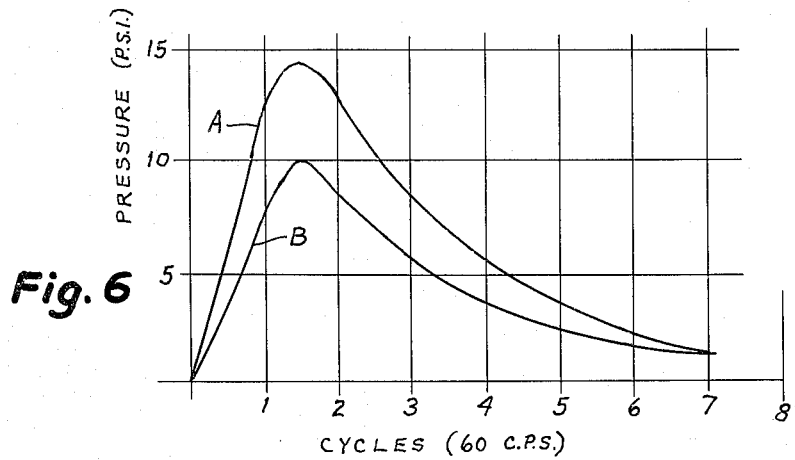
FIG. 6 is a graph similar to that shown in FIG. 5 illustrating the pressure within a tank being relieved by the invention herein.

The importance of snap action opening as achieved by the present invention can be seen from FIGS. 5 and 6, which plot the pressure time curves at various points in the transformer tank. Referring to FIG. 5, illustrating pressure conditions within a transformer tank equipped with a conventional valve of the prior art, plot "A" is the rate of rise of pressure deep in the transformer tank at or near the electrical fault, such as the point marked "A" in FIG. 1. When a fault occurs, a tremendous amount of electrical energy is converted into arc energy. Because temperatures in the arc often exceed 2000 degrees Fahrenheit, oil in the vicinity of the arc is vaporized at a very high rate, causing a high rate of pressure rise at the fault. This pressure rise is transmitted to other parts of the transformer tank, including the point marked "B" in FIG. 1, which is the point of pressure sensing. Due to inertia, to cooling of the hot gases, and to the air or gaseous seal above the level of the oil, the rate of rise at point "B" is never quite as rapid as at the point of the fault immediately after fault initiation. Furthermore, because of the above-said conditions, there is a time lag between the curves A and B, the curve B in FIG. 5 being the pressure plot at the pressure sensing and valve opening point "B" in FIG. 1.

However, because excessively high pressure at any one point can rupture or distort the transformer tank, the problem is to relieve the pressure rapidly with maximum orifice opening the instant overpressure is sensed. As seen from FIG. 5, pressure rises rapidly at point A, followed by a later and slightly less rapid pressure rise at B. When the pressure at point B reaches or slightly exceeds the opening pressure, the relief valve "cracks" open. Because the amount of opening is dependent upon the pressure, the valve opens further as the pressure at B builds up. The pressure at B finally reaches a maximum and begins to drop. However, the pressure at A has continued to increase because the rate of flow through the pressure relief valve has not been sufficient to check it. It is this overpressure at the point of the fault that can and does rupture transformer tanks and it is specifically this condition that the device described herein is designed to protect.

Contrasting with this, FIG. 6 shows the pressure time curve of a transformer tank protected with the device herein described. Pressure buildup at both point A and point B are similar to that indicated in FIG. 5, up to the point where pressure at B reaches the valve opening pressure. At this point the valve snaps open, giving full orifice opening to relieve the pressure. Because more volume of gas or fluid is relieved, overpressure at the valve, and even more important, overpressure at the point A, the point of maximum rate of pressure rise and maximum pressure, is greatly reduced.

While the operational advantages of the present invention over prior art devices are obvious, the theory underlying the reasons for this obvious advantage are not fully understood. However, one possible explanation is based upon the great velocity imparted to the sealing disks 41 and 51 when the valve "blows." Although the mass of the disks is relatively small, they store up a great amount of kinetic energy. (Kinetic energy, while varying directly with mass, also varies directly with the square of the velocity.) Since the springs 39 and 49 must overcome this kinetic energy as well as the remaining pressure within the tank before they can reseal the disk 41 and 51 in their normal at rest position as illustrated in FIG. 1, the pressure within the tank drops to a value equal to the combined force of the springs 39 and 49 less the kinetic energy stored in the disks 41 and 51 during their upward travel. To express this in a simple equation, if the combined force of the springs 39 and 49 is expressed as S, the area of the disks 41 and 51 exposed to tank pressure is designated A, and the kinetic energy stored in the disks 41 and 51 as they "blow" open is K, the pressure within the tank when the valve reseals itself may be expressed as:

$$\text{Tank pressure} = \frac{S}{A} - K$$

Attention is again called to the fact that the just described theory is merely an attempt to explain the action of the device and is not intended in any way to limit the practical and pragmatically proven advantages of the invention herein disclosed.

Another possible explanation for the extremely rapid and satisfactory opening action of the valve, is that the first part of the outrush of gas, when the valve first begins to open, reacts against the depending skirt or flange 57 somewhat like the reaction of a jet of fluid against a turbine blade, so that the direction of flow is changed by the flange 57 and the kinetic energy of the flow raises the annular valve member 51 against the force of its spring 49, thereby freeing the inner valve disk 41 to rise against the resistance of only its own spring 39, without being impeded by the member 51 and spring 49. But whatever the true explanation may be, the fact is that this construction actually works remarkably well.

It should also be noted that all of the valve members which engage with or break away from gaskets are preferably coated with one of the commercially available types of silicone lubricants, e.g., Dow-Corning composition No. A4000. Such a coating prevents possible sticking of the valve in the event that the valve does not have occasion to open for a long period of time, the coating also permitting the valve to open readily in all types of atmospheric conditions.

Figure 7:
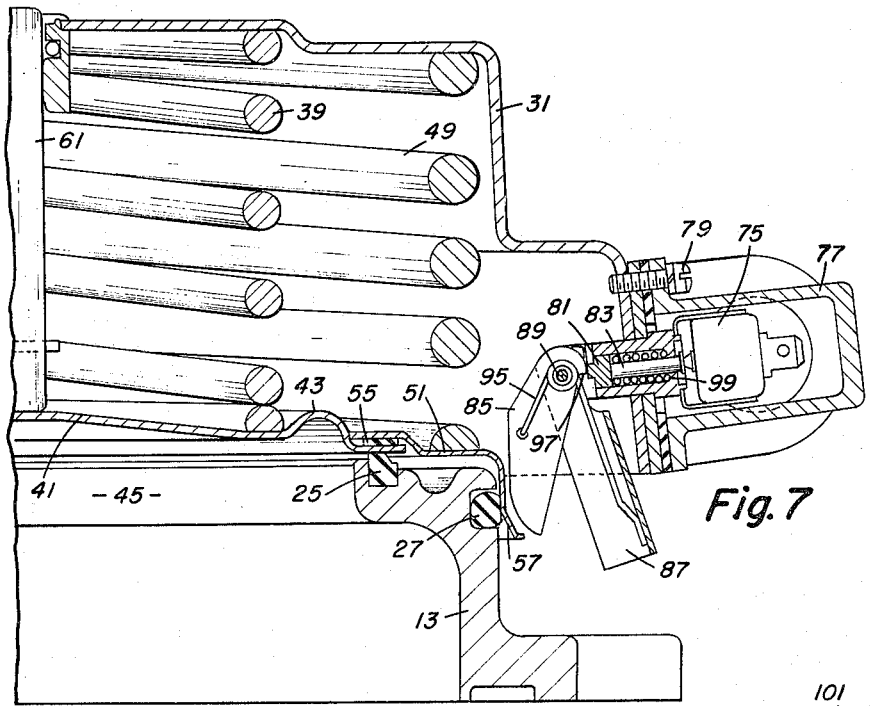
FIG. 7 is a cross sectional view of part of the pressure relief valve showing an electric switch which may be used to control a signal at a remote point, the electric switch and its switch locking mechanism being shown attached to the cover of the valve.

As was stated above, it is often desired to have a remote indication of the operation of a relief valve, and this remote indication is generally accomplished electrically by means of a circuit completed or broken by a switch operated by the valve itself. FIG. 7 illustrates the switching mechanism designed for use with the relief valve disclosed herein to provide such a remote indication. The connection to the remote indicating device (not shown) is made electrically through a miniature switch 75 which is protectively mounted within a cylindrical housing 77 which, in turn, is rigidly mounted to the exterior of the lower flange of the upper housing or cap 31 by means of screws 79. The switch button 81 of the miniature switch 75 closes its electrical contact whenever depressed, and is normally held in its depressed, closed, condition by a spring loaded plunger 83, which is held tightly against the switch button 81 by a switch locking lever 85.

Figure 8:
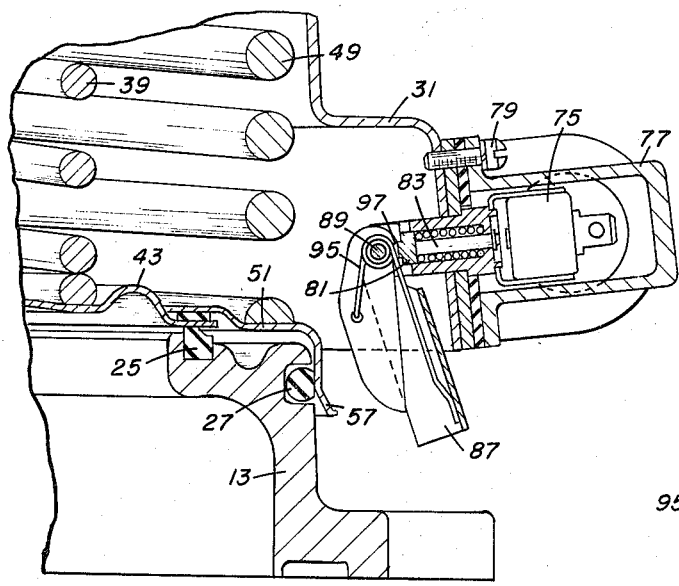
FIG. 8 is an illustration of part of the electric switch mechanism and the switch locking mechanism illustrated in FIG. 7, showing these parts in the position they assume immediately following an operation of the relief valve.
Figure 8A:
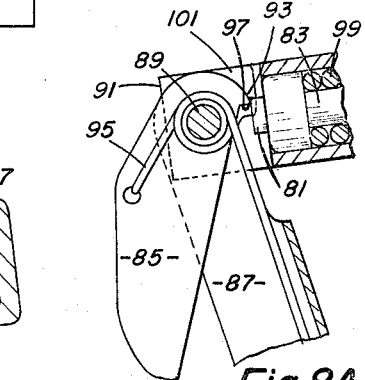
FIG. 8A is a view similar to a fragment of FIG. 7, but on a larger scale, showing additional details.
Figure 8B:
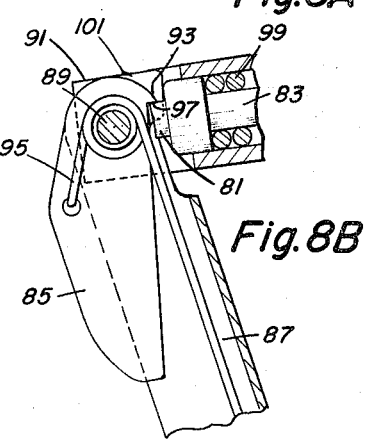
FIG. 8B is a similar view showing a fragment of the structure shown in FIG. 8, for clearer showing of additional details.

The switching locking lever 85 and a resetting arm 87 are mounted side by side on an axle 89 which is held in rigid relation to the other just described members of this remote indication unit by means of two support arms 91 (only one of which is shown). The switch locking lever 85 is designed with a "closed-locking" edge 93 which contacts the end of the spring loaded plunger 83, holding it against the switch button 81. The switch locking lever 85 is maintained with its "closed-locking" edge 93 in contact with the end of the spring loaded plunger 83 by virtue of the action of a spring 95 which is coiled around the axle 89 and has one end bent laterally to extend into a hole in the lever 85, to exert force to tend to swing the lever in a clockwise direction on the axle 89, to keep the lower end of the lever substantially in contact with the periphery of the flange 57 on the valve member 51, as seen in FIG. 7. When the valve member 51 moves upwardly during an opening operation, the lower edge of the flange 57 engages the curved edge of the locking lever 85 and cams it outwardly against the force of the spring 95, swinging it in a counterclockwise direction until the shoulder 97 passes the adjacent end of the plunger 83, allowing the plunger to snap past the shoulder 97 by the force of the plunger spring 99, so that the switch button 81 is released, to alter the circuit condition of the switch (that is, to open it if normally closed, or to close it if normally open). This condition of the switch assembly parts is shown in FIG. 8.

When the relief valve has resealed itself, the member 51, 57 has returned downwardly to its normal position, thus relieving the displacing camming force on the lever 85. However, the lever remains in its displaced position shown in FIG. 8, and the switch remains in its operated position with continuance of the desired fault indication at the remote point, because the shoulder 97 is caught behind the plunger 83, thus preventing the lever 85 from swinging clockwise to its normal position.

When an employee arrives to investigate the cause of the trouble and to reset the parts, he pushes radially inwardly (toward the center of the relief device) on the lower end of the lateral flange on the resetting arm 87, thus swinging it clockwise on the axle 89 against the force of the spring 95, the second end of which constantly presses outwardly on the lateral flange of the arm 87. Near its upper end, the resetting arm 87 has a cam portion 101 which engages the plunger 83 and moves the plunger rightwardly against the force of the spring 99, far enough to release the shoulder 97 so that the switch lever can now swing clockwise back to its normal position (FIG. 7) under the influence of the spring 95. Then the manual displacing force on the resetting arm 87 is removed, and the resetting arm swings back in a counterclockwise direction to its normal position. This completes the resetting of the remote-indicating switch parts. Of course the employee also resets the visual indicating flag 61, simply by pressing vertically downwardly on its protruding upper end, until the upper end of the flag is approximately flush with the top of the canopy or cover 31, 37 as seen in FIG. 1.

Figure 9:
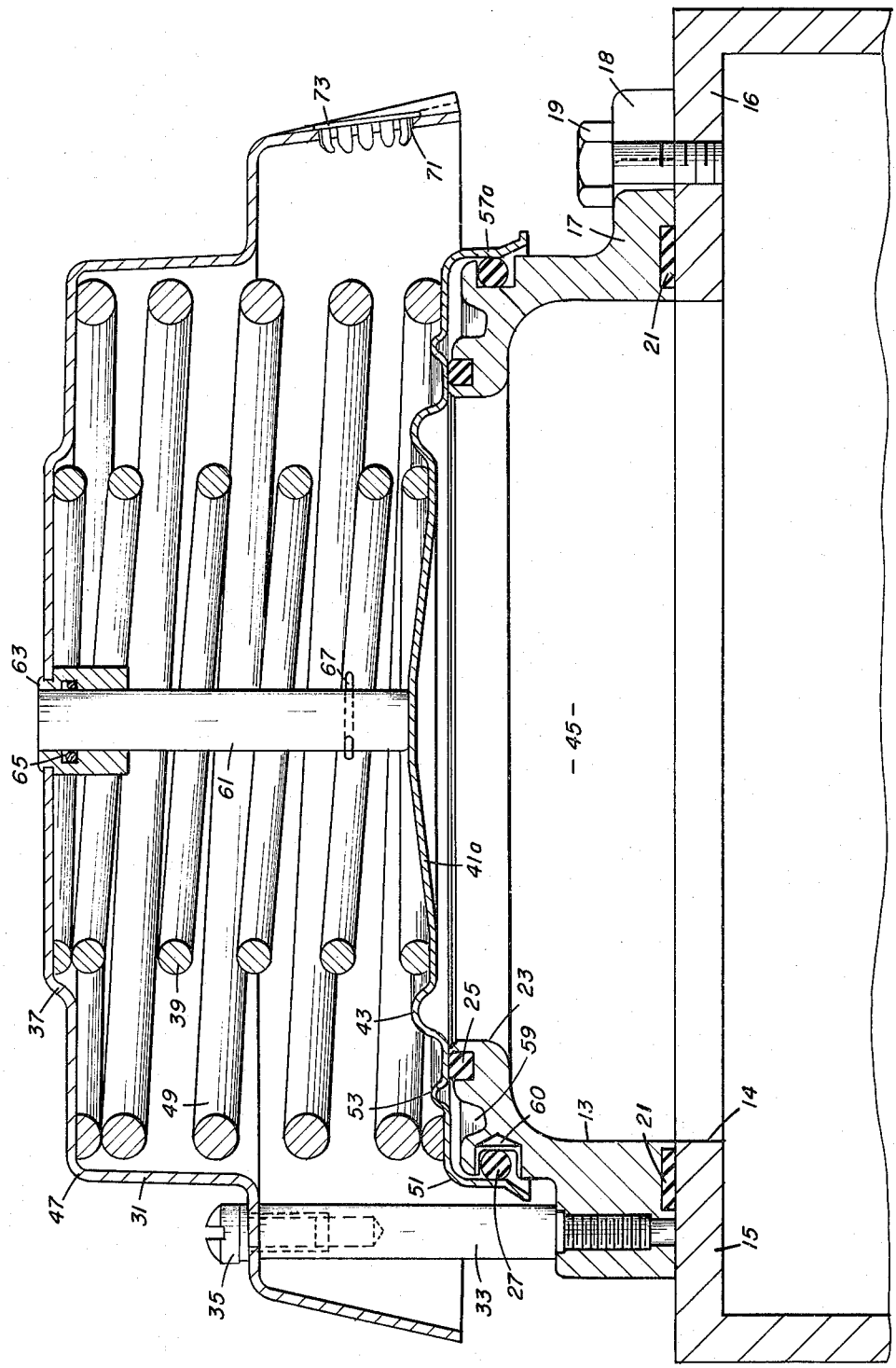
FIG. 9 is a view similar to FIG. 1, showing a modified form of fault protector according to the invention.

Referring now to FIG. 9, there is here illustrated another embodiment of the present invention, substantially the same as the embodiment described above, except that the main closure member 41a is here formed as a single member integral with the depending flange 57a, rather than being formed of a central disk 41 and a separate annular ring 51 with flange 57, as in the previous embodiment. As before, the under face of the member 41a seals against the gasket 25, and the marginal flange 57a seals against the O-ring gasket 27.

The action is in general similar to that described in connection with the first embodiment, except that the special action resulting from the two separate members 41 and 51 is, of course, not present. Nevertheless, a construction of the kind illustrated in FIG. 9 constitutes a substantial improvement over the devices of the prior art. It operates very fast and satisfactorily. When the pressure within the transformer tank rises to the point where the closure member 41a begins to move slightly upwardly and "cracks" the seal at the gasket 25, the pressure escapes into the chamber 59 faster than it can "bleed" out of the chamber 59, so that immediately the diameter on which the pressure acts increases abruptly from the diameter of the gasket 25 to the diameter of the gasket 27, and the greatly increased force of the upward gas pressure quickly opens the closure member and allows quick escape of the excess pressure.

During the many extensive tests employed to check the operation of the disclosed embodiment of the invention herein, it was found that the illustrated pressure relief valve would operate with complete efficiency in spite of severe icing conditions. Since no movement is required of the upper housing or cap 31 (illustrated in FIG. 1) during the operation of the relief valve, it is rigidly mounted and serves as a protective shield, and although it may be covered with ice of several inches thickness, this ice in no way impairs the operation of the relief valve in the manner described above. While it is necessary that the cylinder or flag 61 be raised above the surface of the upper housing or cap 31 to permit the full opening of the valve disk 41, in actual tests it has been found that the high velocity imparted to valve disk 41 upon the operation of the relief valve, as discussed fully above, is sufficient to drive the cylinder or flag 61 through the several inches of ice, and, therefore, it was learned that this particular feature of the invention in no way impairs its efficient operation under conditions of severe icing.

In other tests conducted with the embodiment of the invention as disclosed herein, the entire valve unit was completely submerged in water. By these tests it was shown that even when completely submerged the pressure relief valve illustrated would operate to relieve excessive pressure within the tank and thereafter reseal itself while maintaining the integrity of the tank against the surrounding water.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a housing for hermetically isolating electrical apparatus, of a pressure relief valve comprising a tubular base rigidly mounted in surrounding and sealing relationship to a circular aperture in said housing, said base having an opening and an annular recess in its surface surrounding said opening, a light spring, a disk valve biased by said light spring in closing relation to said opening, a heavy spring, and an annular disk biased by said heavy spring to have a portion overlapping the outer edge of said disk valve and its outer edge in sealing contact with a gasket on the surface of said base extending beyond said annular recess, whereby said annular disk combines with said base to form a pressure sealed chamber including therein the outer edge of said disk valve, whereby the force of said heavy spring also acts upon said disk valve to maintain it in closed relation to said opening in said base until the pressure within said housing exceeds the force of both said heavy and light springs allowing said pressure to leak into said pressure sealed chamber, an inverted cup-like cap of sheet metal rigidly mounted on said base and having a side flange extending downwardly to an elevation at least as low as that of said disk valve and spaced laterally outwardly away from the outer edges of said annular disk, said springs reacting upwardly against said cup-like cap, said cap having a central aperture in the top thereof, and a brightly colored rod slidably mounted within said aperture, the lower end of said rod resting upon the upper surface of said disk valve when said disk valve is in closed position, so that upward opening movement of said disk valve will push said rod upwardly partially through said cap to a conspicuously observable position.

2. In combination, electrical apparatus, a tank for hermetically isolating said apparatus, an aperture in said tank to permit venting of pressure built up in said tank, a tubular base rigidly mounted in surrounding and sealing relationship to said aperture, said base having a level ring raised above the surface of said tank with an opening therein and having first and second concentric annular recesses in said level ring in surrounding relation to said opening, said base having a third annular recess in the outer circumference thereof, a first gasket seated in said first annular recess, a second gasket seated in said third annular recess, a light spring, a valve biased by said light spring in closing relation to said opening, the outer edges of said valve overlapping the circumference of said opening and compressing said first gasket, a heavy spring, and an annular disk movably mounted concentrically to said valve and said level ring having an inner lip overlapping the outer edges of said valve and directly above the area of contact of said valve and said first gasket and having an outer flange passing in surrounding relation to said level ring so as to make sealing contact with said second gasket, said annular disk being held in compression against said second gasket and against the outer edge of said valve by said heavy spring forming a pressure chamber in combination with said second annular recess in said level ring, whereby gas under pressure within said tank begins to leak past said first gasket and into said pressure chamber only when its pressure is in excess of the force exerted on said valve by said light and heavy springs, said annular disk being raised from its position compressing said outer edge of said valve when the pressure within said pressure chamber exceeds the force of said heavy spring, permitting said valve to be accelerated away from said opening, said valve being reseated by said light and heavy springs when the pressure within said tank has dropped to where the force it exerts on said valve is less than the force exerted on said valve by said light spring.

3. The construction as defined in claim 2, further including remote indication switching means comprising an electrical switch having a first and second position, switch latching means responsive to movement of said valve away from said opening for normally latching said switch in one of its positions, said latching means being operated by movement of said valve to unlatch the switch for movement to the other of its positions, and manually operated resetting means for causing said switch latching means to latch said switch in said one of its said positions.

4. The construction as defined in claim 3, further including an inverted cup-like cap rigidly mounted to said tubular base in covering relation to said base and to said valve, disk and spring assemblies, said cap providing a seat for one end of each said springs, and said remote indication switching means being attached to and covered by said cap.

References Cited by the Examiner

UNITED STATES PATENTS

| | | | |
|---|---|---|---|
| 2,263,840 | 11/41 | Franck | 116—117 X |
| 2,904,616 | 9/59 | Koepke et al. | 174—11 |
| 3,100,502 | 8/63 | Ford et al. | 137—469 |

FOREIGN PATENTS 549,899  12/57  Canada.

LARAMIE E. ASKIN, *Primary Examiner.*

JOHN P. WILDMAN, E. JAMES SAX, *Examiners.*